US011874366B2

United States Patent
Li et al.

(10) Patent No.: US 11,874,366 B2
(45) Date of Patent: Jan. 16, 2024

(54) HIGH-PRECISION VEHICLE POSITIONING METHOD BASED ON ULTRA-WIDEBAND IN INTELLIGENT VEHICLE INFRASTRUCTURE COOPERATIVE SYSTEMS

(71) Applicant: Southeast University, Jiangsu (CN)

(72) Inventors: Xu Li, Jiangsu (CN); Huaikun Gao, Jiangsu (CN); Qimin Xu, Jiangsu (CN)

(73) Assignee: Southeast University, Jiangsu (CN)

( * ) Notice: Subject to any disclaimer, the term of this patent is extended or adjusted under 35 U.S.C. 154(b) by 380 days.

(21) Appl. No.: 17/436,614

(22) PCT Filed: May 29, 2019

(86) PCT No.: PCT/CN2019/089089
§ 371 (c)(1),
(2) Date: Sep. 6, 2021

(87) PCT Pub. No.: WO2020/177225
PCT Pub. Date: Sep. 10, 2020

(65) Prior Publication Data
US 2022/0179061 A1  Jun. 9, 2022

(30) Foreign Application Priority Data
Mar. 6, 2019 (CN) .......................... 201910168332.3

(51) Int. Cl.
*G01S 13/87* (2006.01)
*G01S 13/91* (2006.01)

(52) U.S. Cl.
CPC ............ *G01S 13/878* (2013.01); *G01S 13/91* (2013.01)

(58) Field of Classification Search
CPC .............................. G01S 13/878; G01S 13/91
See application file for complete search history.

(56) References Cited

U.S. PATENT DOCUMENTS

2017/0032252 A1   2/2017 Feminella et al.
2020/0348448 A1* 11/2020 Tocornal ................ G06N 3/044

FOREIGN PATENT DOCUMENTS

CN   102445200 A   *   5/2012
CN   108082225         5/2018
(Continued)

OTHER PUBLICATIONS

"International Search Report (Form PCT/ISA/210)" of PCT/CN2019/089089, with English translation thereof, dated Nov. 27, 2019, pp. 1-4.

(Continued)

*Primary Examiner* — Bernarr E Gregory
*Assistant Examiner* — Hailey R Le
(74) *Attorney, Agent, or Firm* — JCIP GLOBAL INC.

(57) ABSTRACT

In Intelligent Vehicle Infrastructure Cooperative Systems (IVICS), a high-precision vehicle positioning method utilizing Ultra-Wide Band (UWB) is proposed. Owing to remarkable wide band of radio signal, this UWB-based positioning method shows excellent anti-interference capability and multi-path immunity, which are essential for achieving high precision in practical traffic scenario. In this approach, several UWB nodes are deliberately deployed at the crossing with the help of roadside infrastructure in IVICS. Meanwhile, an algorithm aiming at Non Line of Sight (NLOS) error compensation is developed to improve the positioning performance. In a word, this method has been demonstrated the potential to achieve accurate, reliable, continuous and integrated localization.

1 Claim, 5 Drawing Sheets (56) References Cited

FOREIGN PATENT DOCUMENTS

| | | |
|---|---|---|
| CN | 207742329 | 8/2018 |
| CN | 108898880 | 11/2018 |
| CN | 109270489 | 1/2019 |
| WO | 2018156652 | 8/2018 |

OTHER PUBLICATIONS

"Written Opinion of the International Searching Authority (Form PCT/ISA/237)" of PCT/CN2019/089089, dated Nov. 27, 2019, pp. 1-4.

* cited by examiner

HIGH-PRECISION VEHICLE POSITIONING METHOD BASED ON ULTRA-WIDEBAND IN INTELLIGENT VEHICLE INFRASTRUCTURE COOPERATIVE SYSTEMS

TECHNICAL FIELD

The present invention relates generally to the field of vehicle navigation and positioning, and more particularly, to a high-precision vehicle positioning method in vehicle infrastructure cooperative scenarios.

BACKGROUND

With the development and progress of the economy and society, the number of motor vehicles in China increases rapidly while road traffic is facing huge challenges. An Intelligent Vehicle Infrastructure Cooperative System (IVICS) emerges and gradually becomes the latest development direction of research on an Intelligent Transport System (ITS) for solving the increasingly serious urban traffic problems. Both the application of vehicle-road coordination and the realization of intelligent transportation depend on high-precision vehicle positioning technology. Specifically, only on the premise of achieving accurate and reliable vehicle positioning, dynamic real-time information interaction between vehicles and between vehicles and roads can be implemented in all-round manner, active vehicle safety control and coordinated road management can be carried out based on the collection and fusion of all-time-space dynamic traffic information, and the effective coordination of people, vehicles, and roads can be fully realized, thus effectively commanding and dispatching the vehicles, improving urban traffic, and ensuring safe driving of the vehicles. Therefore, the vehicle positioning technology is the foundation and one of core contents of the research on vehicle-road coordination and even the intelligent transportation.

At present, the common vehicle navigation and positioning technology includes Dead Reckoning (DR), an Inertial Navigation System (INS), a Global Navigation Satellite System (GNSS), and the like. The DR and the INS mainly use a low-cost vehicle-mounted sensor, such as an electronic compass, a wheel speed sensor, a micromechanical gyroscope, or the like, to realize vehicle navigation and positioning. Because a measurement error of the sensor accumulates with time, its positioning accuracy is generally low. Among various positioning methods, the GNSS is most widely applied in the vehicle positioning field; and generally refers to all satellite navigation systems, among which the Global Positioning System (GPS) of the United States, the GLONASS navigation system of Russia, and the BeiDou Navigation Satellite System of China have relatively mature technology. The GNSS can provide information such as a three-dimensional position, speed, and time for the vehicles in real time, achieving all-weather, all-round navigation and positioning functions. The GNSS has high positioning accuracy in a relatively open and wide environment. However, when the vehicle travels in the urban environment (such as urban canyons, intersections surrounded by tall buildings, etc.), the satellite signal is easily blocked by the high-rise buildings on both sides of the road, resulting in a serious multipath effect and dramatically reducing the positioning accuracy of the GNSS. When the signal is severely blocked, positioning even fails due to an insufficient number of visible satellites.

In addition to the foregoing conventional positioning technologies, Ultra-Wideband (UWB)-based positioning technology emerges and rapidly develops in recent years, which provides a new idea for realizing accurate vehicle positioning. At present, the UWB-based positioning technology is mainly used for indoor positioning, such as positioning of people, smart toy cars, robots, and the like. Due to a much wide bandwidth, the UWB technology enables strong penetration of pulse signals and has a high multi-path distinguishing capacity. Thus, it is also feasible to realize vehicle positioning in the outdoor environment based on the UWB. However, the outdoor scene is generally complicated compared to the indoor environment. In a dynamic traffic environment, UWB signal is susceptible to interference from surrounding travelling vehicles and trees and buildings on both sides of the road, causing Not Line of Sight (NLOS) propagation. An observed distance value between NLOS UWB nodes has a relatively large error, and a large positioning error may be caused if the value is introduced into a positioning solution. Therefore, how to rationally lay out UWB nodes based on road traffic facilities in a relatively complicated traffic scene (such as crossroads, roundabouts, etc.) and to select an appropriate method to identify and compensate the NLOS error of the UWB are the key problems in urgent need to be solved in realization of high-precision UWB-based vehicle positioning, so as to realize dynamic interaction between people, vehicles, and roads in Intelligent Vehicle Infrastructure Cooperative Systems (IVICS), and improve positioning accuracy.

SUMMARY

In view of the shortcomings in the prior art, the present invention provides a vehicle and road coordinated high-precision vehicle positioning method, which reduces a positioning error and realizes high-precision vehicle positioning in an urban environment by means of rational layout of UWB nodes and in combination with an NLOS error processing algorithm.

To achieve the foregoing objective, the present invention adopts the following technical solution: First, UWB fixed nodes are arranged on both sides of a road, and position coordinates of the UWB fixed nodes are acquired by means of a high-precision differential GNSS; then, a UWB mobile node is arranged on the roof of a vehicle, and distances from the UWB mobile node to the UWB fixed nodes are acquired through Time Difference of Arrival (TDOA) method; then, an ARIMA model is established according to historical observed distance values before the current moment, NLOS identification is performed on the UWB fixed nodes one by one by using the Autoregressive Integrated Moving Average (ARIMA) model, and the observed distance values are compensated and corrected according to an identification result; and finally, the coordinates of the UWB mobile node are calculated according to the corrected distances from the UWB mobile node to the UWB fixed nodes and the coordinates of the UWB fixed nodes, to obtain an accurate position of the vehicle.

Figure 1:
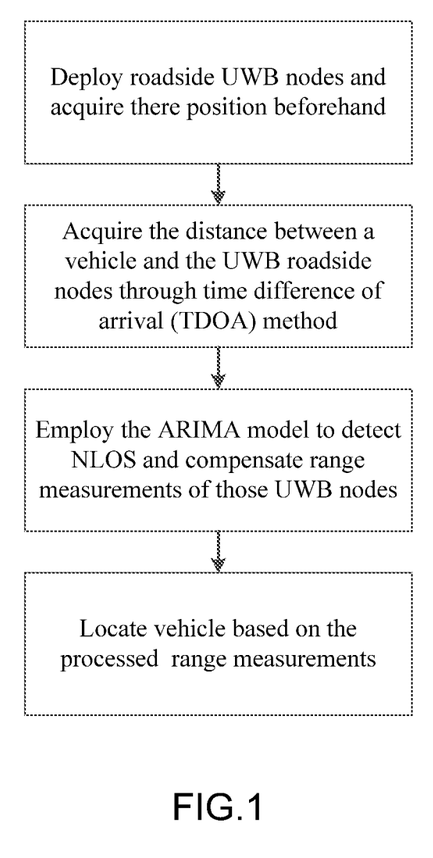
FIG. 1 is a flowchart of the present invention.

The idea of the present invention is further described below with reference to FIG. 1:

A process of the present invention is shown in FIG. 1.

A vehicle and road coordinated high-precision vehicle positioning method based on UWB is provided. By means of rational layout of UWB nodes and in combination with an NLOS error compensation algorithm in vehicle infrastructure cooperative scenarios of a typical city, a positioning error caused by NLOS propagation of UWB signals in a dynamic traffic scene can be effectively reduced, thus improving UWB positioning accuracy and realizing accurate, reliable, and real-time positioning of urban vehicles. The method includes the following steps:

Step 1) A UWB layout scheme is formulated, UWB fixed nodes are arranged on both sides of a road, and position coordinates of the UWB fixed nodes are measured.

Figure 2:
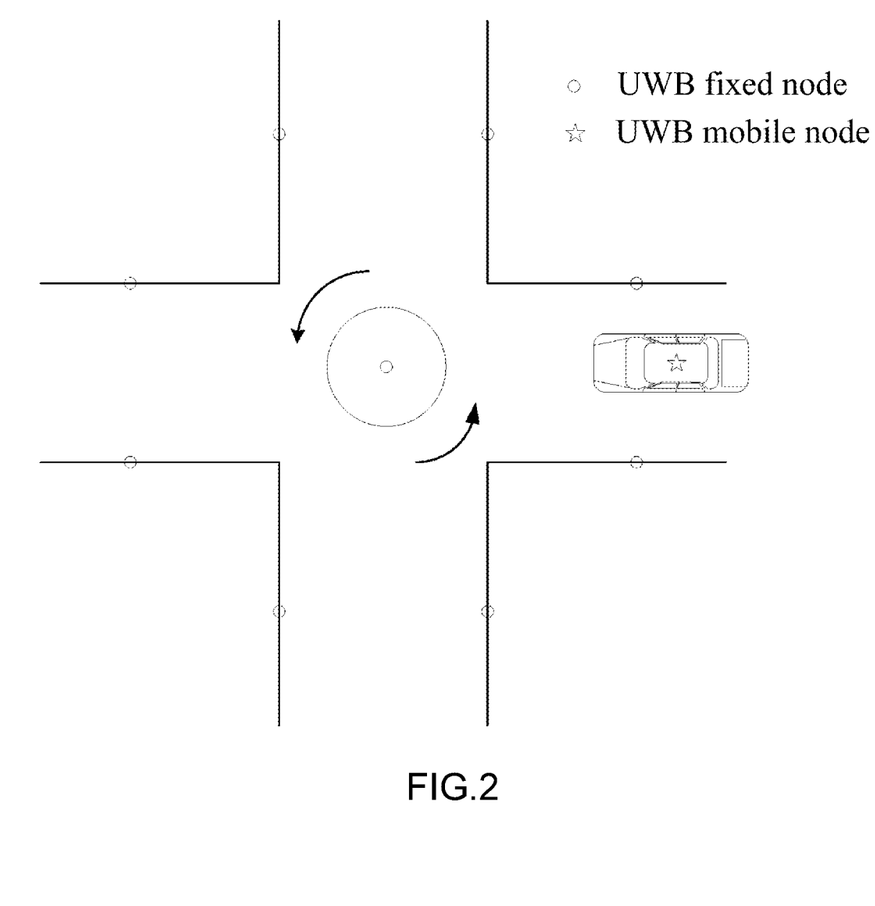
FIG. 2 is a schematic diagram of UWB node layout at a crossroad in a typical city.

The number and mounting positions of the UWB fixed nodes are determined necessarily based on an actual traffic scene and in comprehensive consideration of cost and positioning accuracy requirements, to formulate a rational layout scheme. FIG. 2 shows a layout scheme designed for a crossroad area in a typical city, where a total of nine UWB fixed nodes are arranged on both sides of the roads in four different directions of the crossroad and at the center of a roundabout. Such a layout can cover the entire crossroad to the greatest extent, realizing complete positioning of a vehicle at the crossroad area. Moreover, the UWB node arranged at the center of the roundabout is not easily blocked and unlikely to suffer from interference, thus facilitating improvement of positioning accuracy.

Step 2) A UWB mobile node is arranged on the roof directly above the center of mass of the vehicle, which can move with the vehicle. Therefore, the coordinates of the mobile node are considered as the coordinates of the vehicle. The UWB mobile node periodically sends signals and receives those returned from the fixed nodes, and according to time information of signal sending and returning, distances from the vehicle-mounted UWB mobile node to the UWB fixed nodes are calculated by means of TDOA.

Figure 3:
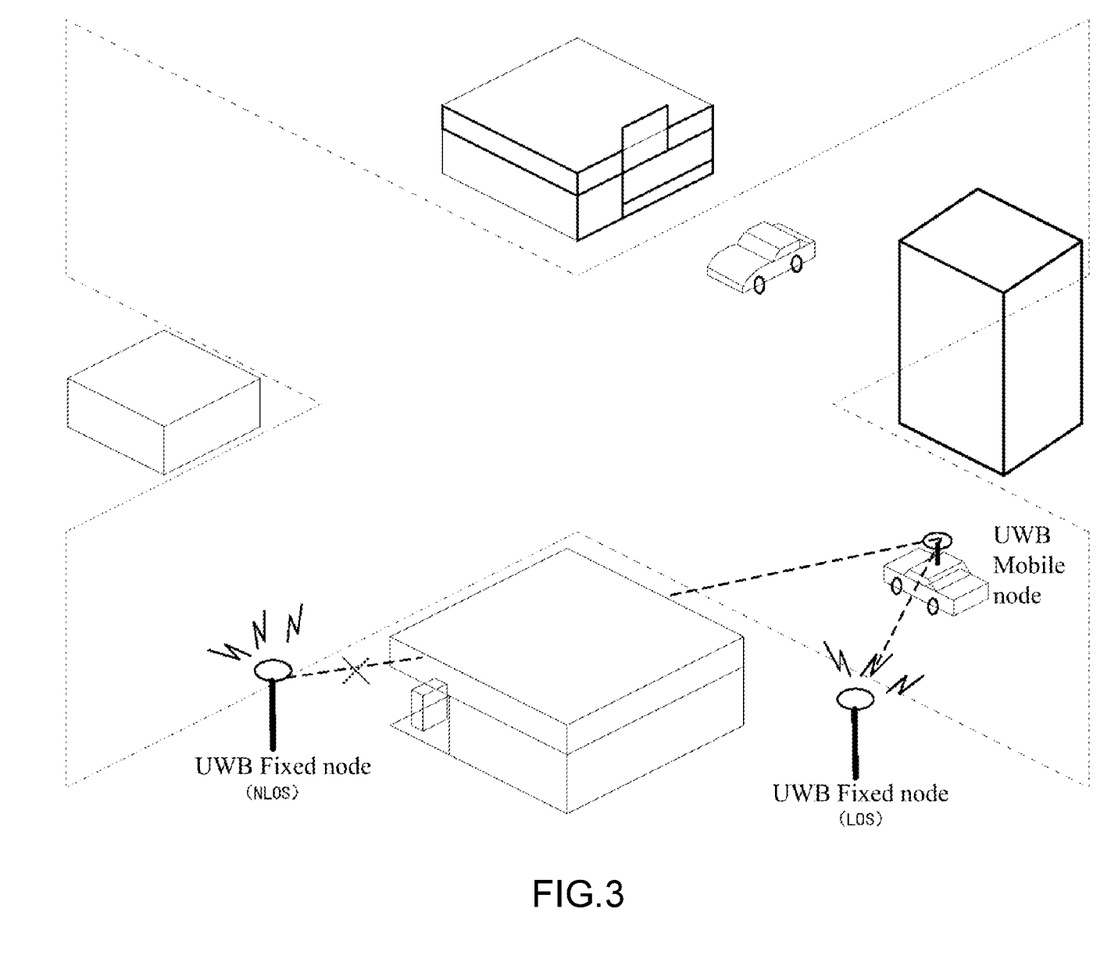
FIG. 3 is a schematic diagram of LOS and NLOS UWB nodes in a dynamic traffic scene.

If there is no block between the UWB nodes, namely, in the case of LOS propagation, a calculated observed distance value approximates the true value. However, in the dynamic traffic scene shown in FIG. 3, the straight-line propagation between UWB nodes is easily blocked by surrounding travelling vehicles, and trees and buildings on both sides of the road, resulting in reflection, diffraction, or the like in a signal propagation path, namely, NLOS propagation. The observed distance value obtained in this case has a relatively large error, and the positioning accuracy may be greatly degraded if the value is introduced into a positioning solution.

Step 3) An Autoregressive Integrated Moving Average (ARIMA) model is established according to historical observed distance values before the current moment, NLOS identification is performed on the UWB fixed nodes one by one by using the ARIMA model, and the observed distance value is compensated and corrected according to an identification result. A specific process is as follows:

1) testing stationarity of a time series constituted by distance observations from an initial moment to the current moment; and if the time series is non-stationary, performing differential processing on the series to convert it into a stationary time series, where an order for the differential processing is d;
2) after the stationary processing, determining orders of the ARIMA model according to autocorrelation and partial correlation functions of the stationary time series, where the orders of the ARIMA model are p and q;
3) estimating parameters of an autoregressive part and a moving average part in the ARIMA model by means of conditional least square;
4) performing a unit root test on a residual series of the established ARIMA (p, d, q) model to determine whether the residual series is a white noise series; if the ARIMA model passes the test, performing forecasting, or otherwise, re-estimating model parameters until the model passes the test;
5) forecasting a distance from the UWB mobile node to each UWB fixed node at the current moment by using the ARIMA model which passes the test, to obtain a forecasted distance value d(t) at the current moment, where an observed distance value at the current moment is d(t) and an absolute value of a difference between the forecasted value and the observed value is |d(t)−d(d)|; and
6) setting an NLOS identification threshold $\theta_{thr}$ according to complexity of the traffic scene and requirements for the positioning accuracy; if $|d(t)-d(t)| \geq \theta_{thr}$, determining that NLOS propagation occurs between the UWB mobile node and the UWB fixed nodes and the observed distance value d(t) in this case has a relatively large NLOS error; and correcting the distances from the mobile node to the UWB fixed nodes according to the values forecasted based on the ARIMA model.

Step 4) According to the corrected distances from the UWB mobile node to the UWB fixed nodes and the coordinates of the UWB fixed nodes, a coordinate equation is established based on a processed range measurements, and the coordinates of the UWB mobile node are calculated by using the least square method, to obtain an accurate position of the vehicle.

The present invention has the following advantageous effects:

1. The present invention proposes an NLOS identification and error compensation algorithm based on an ARIMA model for the UWB nodes, which can effectively reduce UWB distance measurement error in a dynamic environment, thus improving UWB-based positioning accuracy.
2. The method of the present invention realizes the application of the UWB-based positioning technology in vehicle navigation field in an actual traffic environment, achieving high-precision positioning of urban vehicles.

DETAILED DESCRIPTION OF THE EMBODIMENTS

The present invention is further described in detail below with reference to the accompanying drawings and specific embodiments. It should be understood that the specific embodiments described herein are merely used for explaining the present invention, and is not intended to limit the present invention.

With the development and progress of the economy and society, the number of motor vehicles in China increases rapidly, and road traffic faces a huge challenge. In order to solve the increasingly severe urban traffic problems, an IVICS emerges and gradually becomes the latest development direction of research on an ITS. Both the application of vehicle-road coordination and the realization of intelligent transportation depend on high-precision vehicle positioning technology. Specifically, only on the premise of achieving accurate and reliable vehicle positioning, dynamic real-time information interaction between vehicles and between vehicles and roads can be implemented in all-round manner, active vehicle safety control and coordinated road management can be carried out based on the collection and fusion of all-time-space dynamic traffic information, and the effective coordination of people, vehicles, and roads can be fully realized, thus effectively commanding and dispatching the vehicles, improving urban traffic, and ensuring safe driving of the vehicles. Therefore, the vehicle positioning technology is the foundation and one of core contents of the research on vehicle-road coordination and even the intelligent transportation.

At present, the common vehicle navigation and positioning technology includes DR, an INS, a GNSS, and the like. The DR and the INS mainly use a low-cost vehicle-mounted sensor, such as an electronic compass, a wheel speed sensor, a micromechanical gyroscope, or the like, to realize vehicle navigation and positioning. Because a measurement error of the sensor accumulates with time, its positioning accuracy is generally low. Among various positioning methods, the GNSS is most widely applied in the vehicle positioning field; and generally refers to all satellite navigation systems, among which the GPS of the United States, the GLONASS navigation system of Russia, and the BeiDou Navigation Satellite System of China have relatively mature technology. The GNSS can provide information such as a three-dimensional position, speed, and time for the vehicles in real time, achieving all-weather, all-round navigation and positioning functions. The GNSS has high positioning accuracy in a relatively open and wide environment. However, when the vehicle travels in the urban environment (such as urban canyons, intersections surrounded by tall buildings, etc.), the satellite signal is easily blocked by the high-rise buildings on both sides of the road, resulting in a serious multipath effect and dramatically reducing the positioning accuracy of the GNSS. When the signal is severely blocked, positioning even fails due to an insufficient number of visible satellites.

In addition to the foregoing conventional positioning technologies, UWB-based positioning technology emerges and rapidly develops in recent years, which provides a new idea for realizing accurate vehicle positioning. At present, the UWB-based positioning technology is mainly used for indoor positioning, such as positioning of people, smart toy cars, robots, and the like. Due to a much wide bandwidth, the UWB technology enables strong penetration of pulse signals and has a high multi-path distinguishing capacity. Thus, it is also feasible to realize vehicle positioning in the outdoor environment based on the UWB. However, the outdoor scene is generally complicated compared to the indoor environment. In a dynamic traffic environment, a UWB signal is susceptible to interference from surrounding travelling vehicles and trees and buildings on both sides of the road, causing NLOS propagation. An observed distance value between NLOS UWB nodes has a relatively large error, and a large positioning error may be caused if the value is introduced into a positioning solution. Therefore, how to rationally lay out UWB nodes based on road traffic facilities in a relatively complicated traffic scene (such as crossroads, roundabouts, etc.) and to select an appropriate method to identify and compensate the NLOS error of the UWB are the key problems in urgent need to be solved in realization of high-precision UWB-based vehicle positioning, so as to realize dynamic interaction between people, vehicles, and roads in vehicle infrastructure cooperative scenarios, and further improve positioning accuracy.

In view of the shortcomings in the prior art, the present invention provides a vehicle and road coordinated high-precision vehicle positioning method, which reduces a positioning error and realizes high-precision vehicle positioning in an urban environment by means of rational layout of UWB nodes and in combination with an NLOS error processing algorithm.

Referring to FIG. 1, FIG. 1 shows a process of an embodiment of a high-precision vehicle positioning method according to the present invention.

First, UWB fixed nodes are arranged on both sides of a road, and position coordinates of the UWB fixed nodes are acquired by means of a high-precision differential GNSS. Then, a UWB mobile node is arranged on the roof of a vehicle, and distances from the UWB mobile node to the UWB fixed nodes are acquired by means of TDOA. Then, an ARIMA model is established according to historical observed distance values before the current moment, NLOS identification is performed on the UWB fixed nodes one by one by using the ARIMA model, and the observed distance values are compensated and corrected according to an identification result. Finally, the coordinates of the UWB mobile node are calculated according to the corrected distances from the UWB mobile node to the UWB fixed nodes and the coordinates of the UWB fixed nodes, to obtain an accurate position of the vehicle.

The UWB node in this embodiment is specifically an RK-101-mode UWB module.

The idea of the present invention is further described below with reference to the accompanying drawings:

A high-precision vehicle positioning method utilizing ultra-wideband (UWB) is provided. By means of rational layout of UWB nodes and in combination with an NLOS error compensation algorithm in vehicle infrastructure cooperative scenarios of a typical city, a positioning error caused by NLOS signal propagation in a dynamic traffic scene can be effectively reduced, thus improving UWB positioning accuracy and realizing accurate, reliable, and real-time positioning of urban vehicles. The method includes the following steps:

Step 1) UWB fixed nodes are arranged on both sides of a road, and position coordinates of the UWB fixed nodes are acquired by means of a high-precision differential GNSS.

The number and mounting positions of the UWB fixed nodes are determined necessarily based on an actual traffic scene and in comprehensive consideration of cost and positioning accuracy requirements, to formulate a rational layout scheme. Referring to FIG. 2, FIG. 2 shows a layout scheme proposed for a crossroad area in a typical city, where a total of nine UWB fixed nodes are arranged on both sides of the roads in four different directions of the crossroad and at the center of a roundabout. Such a layout can cover the entire crossroad to the greatest extent, realizing complete positioning of a vehicle at the crossroad area. Moreover, the UWB node arranged at the center of the roundabout is not easily blocked and unlikely to suffer from interference, thus facilitating improvement of positioning accuracy.

Step 2) A UWB mobile node is arranged on the roof directly above the center of mass of the vehicle, which can move with the vehicle. Therefore, the coordinates of the mobile node are considered as the coordinates of the vehicle. The UWB mobile node periodically sends signals and receives those returned from the fixed nodes, and according to time information of signal sending and returning, distances from the vehicle-mounted UWB mobile node to the UWB fixed nodes are calculated by means of TDOA.

If there is no signal block between the UWB nodes, namely, in the case of LOS propagation, a calculated observed distance value approximates the true value. However, in the dynamic traffic scene shown in FIG. 3, the straight-line propagation between UWB nodes is easily blocked by surrounding travelling vehicles, and trees and buildings on both sides of the road, resulting in reflection, diffraction, or the like in a signal propagation path, namely, NLOS propagation. The observed distance value obtained in this case has a relatively large error, and the positioning accuracy may be greatly degraded if the value is introduced into a positioning solution.

Step 3) An ARIMA model is established according to historical observed distance values before the current moment, where the ARIMA model is a famous time series analysis method proposed by Box and Jenkins, and is also referred to as a Box-Jenkins model. For specific model details, reference may be made to the following document: *Pankratz A. Forecasting with univariate Box-Jenkins models: Concepts and cases[M]. John Wiley & Sons,* 2009.

To resolve the problem of a large error in the observed distance value between the NLOS UWB nodes, the present invention provides an NLOS identification and compensation method based on the ARIMA model. By using the ARIMA model, NLOS identification is performed on the UWB fixed nodes one by one, and the observed distance value is compensated and corrected according to an identification result. A specific process is as follows:
1) testing stationarity of a time series constituted by distance observations from an initial moment to the current moment; and if the time series is non-stationary, performing differential processing on the series to convert it into a stationary time series, where an order for the differential processing is d;
2) after the stationary processing, determining orders of the ARIMA model according to autocorrelation and partial correlation functions of the stationary time series, where the orders of the ARIMA model are p and q;
3) estimating parameters of an autoregressive part and a moving average part in the ARIMA model by means of conditional least square;
4) performing a unit root test on a residual series of the established ARIMA (p, d, q) model to determine whether the residual series is a white noise series; if the ARIMA model passes the test, performing forecasting, or otherwise, re-estimating model parameters until the model passes the test;
5) forecasting a distance from the UWB mobile node to each UWB fixed node at the current moment by using the ARIMA model which passes the test, to obtain a forecasted distance value d (t) at the current moment, where an observed distance value at the current moment is d(t) and an absolute value of a difference between the forecasted value and the observed value is |d(t)−d(t)|; and
6) setting an NLOS identification threshold $\theta_{thr}$ according to complexity of the traffic scene and requirements for the positioning accuracy; if $|d(t)-d(t)| \geq \theta_{thr}$, determining that NLOS propagation occurs between the UWB mobile node and the UWB fixed nodes and the observed distance value d(t) in this case has a relatively large NLOS error; and correcting the distances from the mobile node to the UWB fixed nodes according to the values forecasted based on the ARIMA model.

Step 4) According to the corrected distances from the UWB mobile node to the UWB fixed nodes and the coordinates of the UWB fixed nodes, a coordinate equation is established based on a processed range measurements, and the coordinates of the UWB mobile node are calculated by using the least square method, to obtain an accurate position of the vehicle.

In this embodiment, in order to test the beneficial effect of the proposed NLOS error compensation algorithm based on the ARIMA model, a real vehicle test is performed, and comparison is made between test results before and after processing with the NLOS error compensation algorithm based on the ARIMA model. In this embodiment, an ARIMA (2,1,1) model is used, and the NLOS identification threshold $\theta_{thr}$ is 0.5 m.

Figure 4:
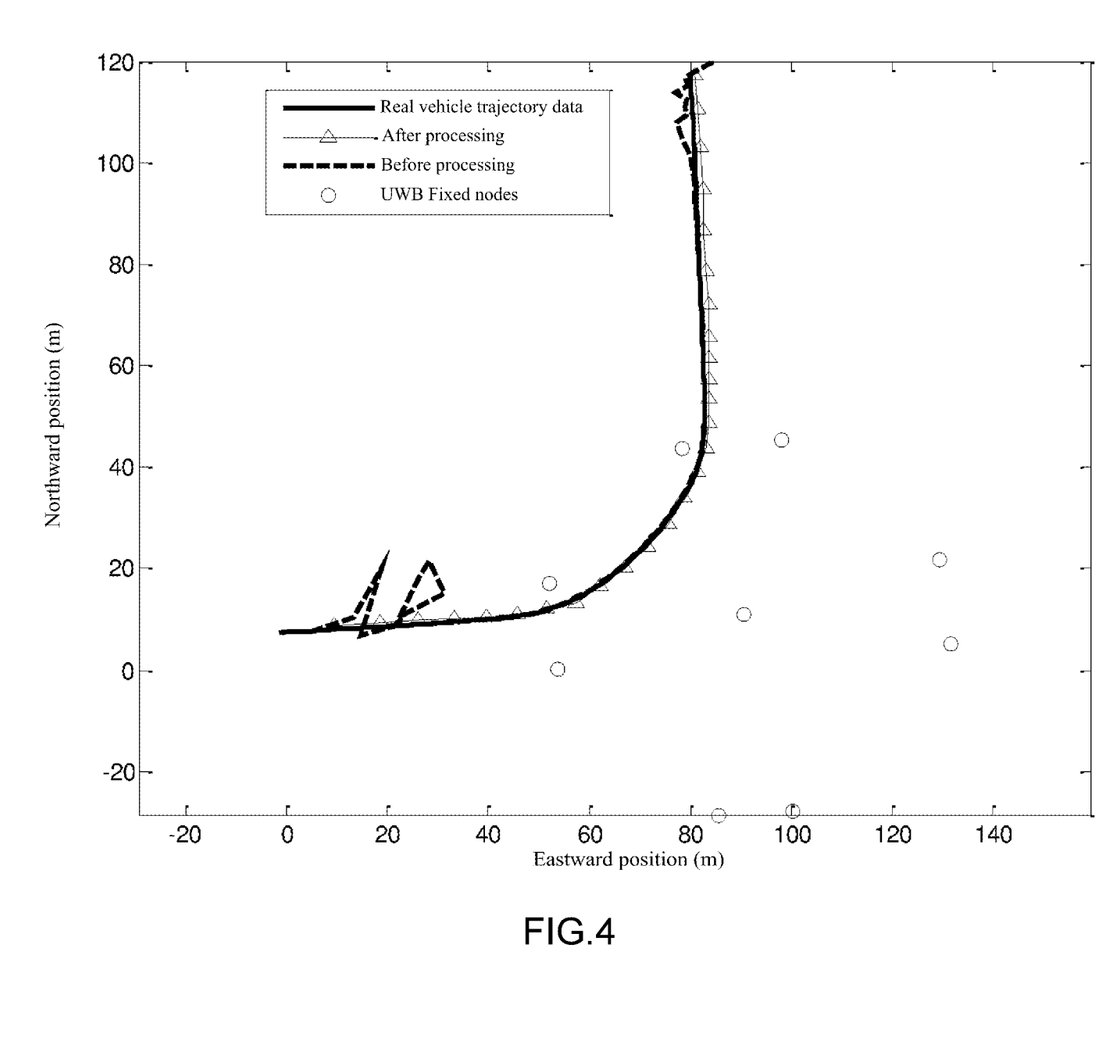
FIG. 4 is a comparison diagram of vehicle positioning trajectory before and after the use of an NLOS error processing algorithm based on an ARIMA model.
Figure 5:
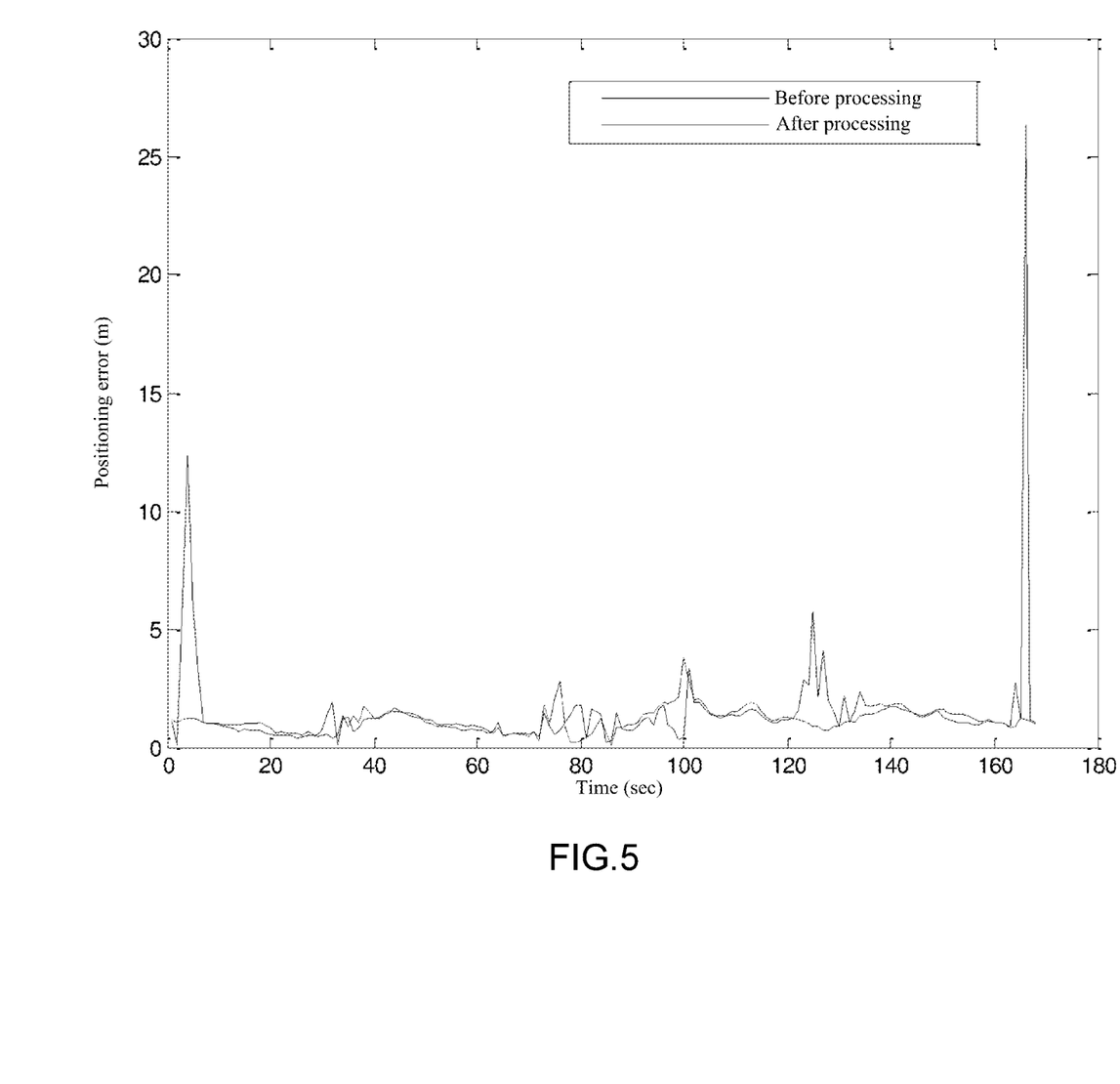
FIG. 5 is a comparison diagram of vehicle positioning errors before and after the use of the NLOS error processing algorithm based on an ARIMA model.

FIG. 4 is a comparison diagram of vehicle positioning trajectory according to a set of test results, and FIG. 5 is a comparison diagram of positioning errors before and after the use of the NLOS error processing algorithm based on an ARIMA model. It can be obviously seen from the trajectory in FIG. 4 and the positioning errors in FIG. 5 that, the vehicle positioning accuracy is remarkably improved after the use of the NLOS error processing algorithm.

The above descriptions are merely preferred embodiments of the present invention, and are not intended to limit the present invention. For those skilled in the art, the present invention may have various modifications and variations. Any modifications, equivalent replacements, improvements or the like made without departing from the spirit and principle of the present invention should all fall within the scope of protection of the present invention.

What is claimed is:

1. A high-precision vehicle positioning method utilizing ultra-wideband (UWB) in Intelligent Vehicle Infrastructure Cooperative Systems (IVICS), comprising the following steps:
step 1) formulating a UWB layout scheme, arranging UWB fixed nodes on both sides of a road, and measuring position coordinates of the UWB fixed nodes;
step 2) arranging a UWB mobile node on the roof of a vehicle, and acquiring an observed distance value from the UWB mobile node to each UWB fixed node by means of Time Difference of Arrival (TDOA);
step 3) establishing an Autoregressive Integrated Moving Average (ARIMA) model according to historical observed distance values before the current moment, performing NLOS identification on the UWB fixed nodes one by one by using the ARIMA model, and compensating and correcting the observed distance values according to an identification result, wherein a specific process is as follows:
1)testing stationarity of a time series constituted by observed distance values from an initial moment to the current moment; and if the time series is non-stationary, performing differential processing on the time series to convert it into a stationary time series;
2)after the stationary processing, determining orders of the ARIMA model according to autocorrelation and partial correlation functions of the stationary time series;
3) estimating parameters of an autoregressive part and a moving average part in the ARIMA model by means of conditional least square;
4) performing a unit root test on a residual series of the established ARIMA model to determine whether the residual series is a white noise series; if the ARIMA model passes the test, performing forecasting, or otherwise, re-estimating model parameters until the ARIMA model passes the test;

5) forecasting a distance from the UWB mobile node to each UWB fixed node at the current moment by using the ARIMA model which passes the test, to obtain a forecasted distance value d(t) at the current moment, wherein an observed distance value at the current moment is d(t) and an absolute value of a difference between the forecasted value and the observed value is |d(t)−d(t)|; and 6) setting an NLOS identification threshold $\theta_{thr}$ according to complexity of the traffic scene and requirements for the positioning accuracy; if |d(t)−d(t)|≥$\theta_{thr}$, determining that NLOS propagation occurs between the UWB mobile node and the UWB fixed nodes and the observed distance value d(t) in this case has a relatively large NLOS error; and correcting the distances from the mobile node to the UWB fixed nodes according to the values forecasted based on the ARIMA model; and step 4) according to the corrected distances from the UWB mobile node to the UWB fixed nodes and the coordinates of the UWB fixed nodes, establishing a coordinate equation based on a processed range measurements, and calculating the coordinates of the UWB mobile node by using the least square method, to obtain an accurate position of the vehicle.

* * * * *